US010856287B2

(12) United States Patent
Hu et al.

(10) Patent No.: US 10,856,287 B2
(45) Date of Patent: Dec. 1, 2020

(54) FRAME STRUCTURE, COMMUNICATION DEVICES AND METHODS FOR COMMUNICATION

(71) Applicant: HUAWEI TECHNOLOGIES CO., LTD., Guangdong (CN)

(72) Inventors: Liang Hu, Shenzhen (CN); Chan Zhou, Munich (DE); Markus Martin Dillinger, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/862,062

(22) Filed: Jan. 4, 2018

(65) Prior Publication Data

US 2018/0132238 A1 May 10, 2018

Related U.S. Application Data

(63) Continuation of application No. PCT/EP2015/065370, filed on Jul. 6, 2015.

(51) Int. Cl.
*H04B 7/00* (2006.01)
*H04W 72/04* (2009.01)
(Continued)

(52) U.S. Cl.
CPC .... *H04W 72/0446* (2013.01); *H04B 7/18504* (2013.01); *H04L 5/0044* (2013.01);
(Continued)

(58) Field of Classification Search
CPC combination set(s) only.
See application file for complete search history.

(56) References Cited

U.S. PATENT DOCUMENTS 9,241,365 B2 * 1/2016 Wu .............. H04W 76/23
2010/0279672 A1 * 11/2010 Koskela .......... H04W 36/30
455/418
(Continued)

FOREIGN PATENT DOCUMENTS

CN   103024911 A   4/2013
CN   103210674 A   7/2013
(Continued)

OTHER PUBLICATIONS

European Office Action dated Nov. 30, 2018 in related European Patent Application No. 15736431.6 (11 pages).
(Continued)

*Primary Examiner* — Atique Ahmed
(74) *Attorney, Agent, or Firm* — Kilpatrick Townsend & Stockton LLP

(57) ABSTRACT

The application relates to a frame structure for network communication, in particular for device-to-device (D2D) network communication, comprising a control channel, wherein the control channel comprises a first control channel portion associated with a network-assisted communication mode and a second control channel portion associated with an ad-hoc communication mode, and a data channel, wherein the frame structure is configured to communicate control data within the control channel over a first communication resource, the first communication resource being associated with the first control channel portion, wherein the frame structure is configured to communicate control data within the control channel over a second communication resource, the second communication resource being associated with the second control channel portion, and wherein the frame structure is configured to communicate payload data within the data channel over a further communication resource.

13 Claims, 5 Drawing Sheets

(51) Int. Cl.

| | | |
|---|---|---|
| *H04L 5/00* | (2006.01) | |
| *H04W 56/00* | (2009.01) | |
| *H04B 7/185* | (2006.01) | |
| *H04W 74/08* | (2009.01) | |
| *H04W 84/18* | (2009.01) | |
| *H04W 4/40* | (2018.01) | |

(52) U.S. Cl.
CPC .......... *H04L 5/0053* (2013.01); *H04L 5/0094* (2013.01); *H04W 56/00* (2013.01); *H04W 72/0406* (2013.01); *H04W 72/0413* (2013.01); *H04W 74/0816* (2013.01); *H04W 84/18* (2013.01); *H04W 4/40* (2018.02)

(56) References Cited

U.S. PATENT DOCUMENTS

| | | | |
|---|---|---|---|
| 2011/0238259 A1* | 9/2011 | Bai ................. | H04L 67/125 701/31.4 |
| 2011/0305208 A1 | 12/2011 | Wu et al. | |
| 2013/0223356 A1* | 8/2013 | Khoshnevis ........ | H04W 72/042 370/329 |
| 2013/0272236 A1 | 10/2013 | Beale | |
| 2014/0187283 A1 | 7/2014 | Nimbalker et al. | |
| 2014/0199969 A1 | 7/2014 | Johnsson et al. | |
| 2014/0204847 A1 | 7/2014 | Belleschi et al. | |
| 2014/0293821 A1 | 10/2014 | Breuer et al. | |
| 2014/0328329 A1 | 11/2014 | Novlan et al. | |
| 2016/0044652 A1* | 2/2016 | Xue ................. | H04W 56/001 370/329 |
| 2016/0192402 A1 | 6/2016 | Zakrzewski et al. | |
| 2016/0197797 A1 | 7/2016 | Grotendorst et al. | |
| 2016/0198455 A1* | 7/2016 | Caretti ............. | H04W 72/042 370/329 |
| 2016/0337839 A1* | 11/2016 | Chae ................. | H04W 72/1242 |
| 2016/0345274 A1* | 11/2016 | Zhao ................. | H04W 52/243 |
| 2017/0230939 A1* | 8/2017 | Rudolf ............... | H04L 12/1863 |
| 2017/0251486 A1 | 8/2017 | Hu et al. | |

FOREIGN PATENT DOCUMENTS

| | | |
|---|---|---|
| CN | 103250453 A | 8/2013 |
| CN | 103959661 A | 7/2014 |
| EP | 2 665 325 B1 | 8/2014 |
| WO | 2014/047907 A1 | 4/2014 |
| WO | 2014/054990 A1 | 4/2014 |
| WO | 2014/062035 A1 | 4/2014 |
| WO | 2014089791 A1 | 6/2014 |
| WO | 2014/180517 A1 | 11/2014 |
| WO | 2015/014395 A1 | 2/2015 |
| WO | 2015025046 A1 | 2/2015 |
| WO | 2015/054261 A1 | 4/2015 |

OTHER PUBLICATIONS

Mangel, et al., "A Comparison of UMTS and LTE for Vehicular Safety Communication at Intersections," 2010 IEEE Vehicular Networking Conference, pp. 293-300.

Fodor, et al., "Design Aspects of Network Assisted Device-to-Device Communications," IEEE Communications Magazine, Mar. 2012, pp. 170-177.

Doppler, et al., "Device-to-Device Communication as an Underlay to LTE-Advanced Networks," IEEE Communications Magazine, Dec. 2009, pp. 42-49.

Jiang, et al., "IEEE 802.11p: towards an International Standard for Wireless Access in Vehicular Environments," IEEE Vehicular Technology Conference, 2008, pp. 2036-2040.

Kim, et al., "Multivehicle Cooperative Driving Using Cooperative Perception: Design and Experimental Validation," IEEE Transactions on Intelligent Transportation Systems, vol. 16, No. 2, Apr. 2015, pp. 663-680.

Huawei, HiSilicon, "Physical channel design for D2D communication," 3GPP TSG RAN WG1, Meeting #75, Nov. 11-15, 2013, R1-135386, XP50735067A, 6 pgs.

Gomes, et al., "The See-Through System: From Implementation to Test-Drive," 2012 IEEE Vehicular networking Conference (VNC), pp. 40-47.

"Intelligent Transport Systems (ITS); Vehicular Communications; Basic Set of Applications; Part 2: Specification of Cooperative Awareness Basic Service," ETSI TS 102 637-2, V1.2.1, Mar. 2011, 18 pgs.

"3rd Generation Partnership Project; Technical Specification Group Radio Access Network; Study on LTE Device to Device Proximity Services; Radio Aspects (Release 12)," 3GPP TR 36.843, V12.0.1, Mar. 2014, 50 pgs.

International Search Report dated Mar. 3, 2016, in corresponding International Patent Application No. PCT/EP2015/065370, 6 pgs.

Written Opinion of the International Searching Authority dated Mar. 3, 2016, in corresponding International Patent Application No. PCT/EP2015/065370, 8 pgs.

International Search Report dated Mar. 3, 2016 in corresponding International Patent Application No. PCT/EP2015/065370.

Samsung,"Procedures for D2D frame number alignment",3GPP TSG RAN WG1 Meeting #78 R1-143101,Dresden, Germany, Aug. 18-22, 2014, total 7 pages.

\* cited by examiner

FRAME STRUCTURE, COMMUNICATION DEVICES AND METHODS FOR COMMUNICATION

CROSS-REFERENCE TO RELATED APPLICATIONS

This application is a continuation of International Application No. PCT/EP2015/065370, filed on Jul. 6, 2015, the disclosure of which is hereby incorporated by reference in its entirety.

TECHNICAL FIELD

The present invention relates to the technical field of medium access control (MAC) in communication networks. More specifically, the present invention relates to a frame structure and communication devices and methods for network communication.

BACKGROUND

In communication networks, communication resources used for communication, such as time slots, frequency channels, resource blocks and the like, usually have to be shared by a plurality of communication devices. In order to coordinate an access of the plurality of communication devices to the communication resources, medium access control (MAC) mechanisms can be applied. Common mechanisms for medium access control (MAC) are, for instance, carrier sense multiple access with collision avoidance (CSMA/CA) or carrier sense multiple access with collision detection (CSMA/CD). Data to be communicated can be embedded in a frame structure adapted to the chosen medium access control (MAC) mechanism.

In CSMA/CA, a carrier sensing scheme is used, wherein the plurality of communication devices can attempt to avoid collisions by transmitting only when the communication resource is sensed to be idle. In CSMA/CD, a carrier sensing scheme is used, wherein a device can detect collisions while transmitting data, can stop transmitting the data, and can wait for a time interval before resending the data.

Newly emerging applications, e.g. vehicle-to-X (V2X) communications using device-to-device (D2D) communications, can pose challenges with regard to providing, for instance, a low latency and a high reliability within a communication network. Moreover, data having different priorities may have to be communicated within the communication network. Conventional medium access control (MAC) mechanisms in conjunction with conventional frame structures, however, are usually not capable of providing these functionalities concurrently and can suffer from a lack of flexibility and scalability.

In G. Fodor et al., "Design Aspects of Network Assisted Device-to-Device Communications", IEEE Communications Magazine, May 2011, a D2D communication network is described.

SUMMARY

It is an object of the application to provide a concept to improve the effectiveness and efficiency of a communication network.

This object is achieved by the respective subject-matter of the independent claims. Further implementation forms are apparent from the dependent claims, the description and the figures.

According to a first aspect the application relates to a frame structure for network communication, in particular for device-to-device (D2D) network communication, the frame structure comprising a control channel, wherein the control channel comprises a first control channel portion associated with a network-assisted communication mode and a second control channel portion associated with an ad-hoc communication mode, and a data channel, wherein the frame structure is configured to communicate control data within the control channel over a first communication resource, the first communication resource being associated with the first control channel portion, wherein the frame structure is configured to communicate control data within the control channel over a second communication resource, the second communication resource being associated with the second control channel portion, and wherein the frame structure is configured to communicate payload data within the data channel over a further communication resource.

A frame structure according to the first aspect of the application allows supporting both a network-assisted communication mode and an ad-hoc communication mode of a plurality of communication devices within a communication network at the same time. By means of a frame structure according to the first aspect of the application it is possible for a communication device, for instance, to seamlessly switch from the network-assisted communication mode to the ad-hoc communication mode in case network assistance is no longer available. Furthermore it can be achieved that even ad-hoc mode devices (which are currently not in a network assisted mode) don't interfere with network assisted mode devices and vice versa, as the frame structure provides dedicated communication resources for the corresponding control channels portions to be used by the devices depending on in what mode the devices currently are (network assisted mode or ad hoc mode). Hence, the effectiveness and efficiency of a communication network employing such frame structure is improved.

In a first possible implementation form of the first aspect of the application the first control channel portion comprises a high priority part and a low priority part and the second control channel portion comprises a high priority part and a low priority part. By distinguishing between high and low priority parts in the control channel portions, receiving devices can easily determining without additional signaling if a certain control information is of high or low priority. Hence, signaling overhead is reduced.

In a second possible implementation form of the first implementation form of the first aspect of the application the first communication resource is associated with the high priority part of the first control channel portion, and the second communication resource is associated with the high priority part of the second control channel portion, wherein the frame structure is configured to communicate control data within the control channel over a third communication resource, the third communication resource being associated with the low priority part of the first control channel portion, and wherein the frame structure is configured to communicate control data within the control channel over a fourth communication resource, the fourth communication resource being associated with the low priority part of the second control channel portion. By having dedicated communication resources in the frame structure for high priority parts and low priority parts it can be achieved that devices which are only interested in the high priority information can only read the communication resources associated to the high priority parts and don't need to read communication resources associated to the low priority part.

In a third possible implementation form of the first aspect of the application as such or the first or the second implementation form thereof the second control channel portion comprises a communication resource for communicating a synchronization sequence for synchronizing communication devices operating in the ad-hoc communication mode.

In a fourth possible implementation form of the first aspect of the application as such or any one of the first to third implementation form thereof the first control channel portion does not comprise a communication resource for communicating a synchronization sequence.

In a fifth possible implementation form of the first aspect of the application as such or any one of the first to fourth implementation form thereof the second control channel portion comprises a communication resource for communicating context data.

In a sixth possible implementation form of the first aspect of the application as such or any one of the first to fifth implementation form thereof the first control channel portion does not comprise a communication resource for communicating context data.

The frame structure can be a unified medium access control (MAC) frame structure.

The first communication resource, the second communication resource, the third communication resource, the fourth communication resource and/or the further communication resource can comprise a sub-frame, a frequency channel, a coding sequence and/or a resource block.

The frame structure can be embedded within a frequency division duplexing (FDD) uplink frequency band or a time division duplexing (TDD) uplink time frame of a LTE communication frame. In particular, the frame structure can be embedded within a physical uplink shared channel (PUSCH) and/or a physical uplink control channel (PUCCH).

According to a second aspect of the application the application relates to a communication device configured to operate in a network-assisted communication mode and an ad-hoc communication mode, wherein in the network-assisted communication mode the communication device is configured to transmit control data related to the network-assisted communication mode using a first communication resource being associated with the network-assisted communication mode, and wherein in the ad-hoc communication mode the communication device is configured to transmit control data related to the ad-hoc communication mode using a second communication resource being associated with the ad-hoc communication mode. By using different communication resources for the control channel in dependence on the mode the communication device is currently operating in, it can be achieved that ad-hoc mode devices (which are currently not in a network assisted mode) don't interfere with network assisted mode devices and vice versa, as the communication device uses dedicated communication resources for the corresponding control channels portions to be depending on in what mode the device is currently in (network assisted mode or ad hoc mode). Hence, the effectiveness and efficiency of a communication network employing such communication devices is improved.

The communication device can be arranged within a vehicle or car, or can be carried by a pedestrian. Furthermore, the communication device can be arranged within a traffic infrastructure device.

The communication device can be configured to operate within a vehicle-to-X (V2X) communication network or a device-to-device (D2D) communication network. The vehicle-to-X (V2X) communication network or the device-to-device (D2D) communication network can be an IEEE 802.11p based communication network or a long term evolution (LTE) based communication network.

In a first possible implementation form of the second aspect of the application the first communication resource is associated with a first control channel portion of a control channel and the second communication resource is associated with a second control channel portion of the control channel, wherein the control channel is part of a frame structure and wherein the frame structure further comprises a data channel configured to communicate payload data using a further communication resource. By employing mentioned frame structure in the communication device, it can be achieved that different communication devices are compatible with each other and can together improve the efficiency of a communication network employing such communication device.

In a second possible implementation form of the first implementation form of the second aspect of the application the first control channel portion comprises a high priority part and a low priority part and the second control channel portion comprises a high priority part and a low priority part. By distinguishing between high and low priority parts in the control channel portions, receiving devices can easily determining without additional signaling if a certain control information is of high or low priority. Hence, signaling overhead is reduced.

In a third possible implementation form of the second implementation form of the second aspect of the application the first communication resource is associated with the high priority part of the first control channel portion and the second communication resource is associated with the high priority part of the second control channel portion, wherein the communication device is configured to communicate control data within the control channel over a third communication resource, the third communication resource being associated with the low priority part of the first control channel portion, and wherein the communication device is configured to communicate control data within the control channel over a fourth communication resource, the fourth communication resource being associated with the low priority part of the second control channel portion. By having dedicated communication resources in the frame structure for high priority parts and low priority parts it can be achieved that devices which are only interested in the high priority information can only read the communication resources associated to the high priority parts and don't need to read communication resources associated to the low priority part.

The frame structure can be a unified medium access control (MAC) frame structure.

The first communication resource, the second communication resource, the third communication resource, the fourth communication resource and/or the further communication resource can comprise a sub-frame, a frequency channel, a coding sequence and/or a resource block.

The frame structure can be embedded within a frequency division duplexing (FDD) uplink frequency band or a time division duplexing (TDD) uplink time frame of a LTE communication frame. In particular, the frame structure can be embedded within a physical uplink shared channel (PUSCH) and/or a physical uplink control channel (PUCCH).

According to a third aspect the application relates to a communication device for receiving control data, wherein the communication device is configured to, when the control data was received using a first communication resource, determine the control data as being associated with a network-assisted communication mode and, when the control data was received using a second communication resource, determine the control data as being associated with an ad-hoc communication mode. By based on the used determining the type of control data (is it associated to network-assisted communication mode or ad-hoc communication mode) based on the used communication resource, additional signaling can be avoided.

The communication device can be arranged within a vehicle or car, or can be carried by a pedestrian. Furthermore, the communication device can be arranged within a traffic infrastructure device.

The communication device can be configured to operate within a vehicle-to-X (V2X) communication network or a device-to-device (D2D) communication network. The vehicle-to-X (V2X) communication network or the device-to-device (D2D) communication network can be an IEEE 802.11p based communication network or a long term evolution (LTE) based communication network.

In a first possible implementation form of the third aspect of the application the first communication resource is associated with a first control channel portion of a control channel and the second communication resource is associated with a second control channel portion of the control channel, wherein the control channel is part of a frame structure and wherein the frame structure further comprises a data channel configured to communicate payload data using a further communication resource.

In a second possible implementation form of the first implementation form of the third aspect of the application the first control channel portion comprises a high priority part and a low priority part and the second control channel portion comprises a high priority part and a low priority part.

In a third possible implementation form of the second implementation form of the third aspect of the application the first communication resource is associated with the high priority part of the first control channel portion and the second communication resource is associated with the high priority part of the second control channel portion, wherein the communication device is configured to receive control data within the control channel over a third communication resource, the third communication resource being associated with the low priority part of the first control channel portion, and wherein the communication device is configured to receive control data within the control channel over a fourth communication resource, the fourth communication resource being associated with the low priority part of the second control channel portion.

The frame structure can be a unified medium access control (MAC) frame structure.

The first communication resource, the second communication resource, the third communication resource, the fourth communication resource and/or the further communication resource can comprise a sub-frame, a frequency channel, a coding sequence and/or a resource block.

The frame structure can be embedded within a frequency division duplexing (FDD) uplink frequency band or a time division duplexing (TDD) uplink time frame of a LTE communication frame. In particular, the frame structure can be embedded within a physical uplink shared channel (PUSCH) and/or a physical uplink control channel (PUCCH).

According to a fourth aspect the application relates to a communication device for communicating a communication signal, in particular a device-to-device (D2D) network communication signal, wherein the communication device is configured to communicate a frame structure according to the first aspect of the application or an implementation form thereof within the communication signal.

The communication device can be arranged within a vehicle or car, or can be carried by a pedestrian. Furthermore, the communication device can be arranged within a traffic infrastructure device.

The communication device can be configured to operate within a vehicle-to-X (V2X) communication network or a device-to-device (D2D) communication network. The vehicle-to-X (V2X) communication network or the device-to-device (D2D) communication network can be an IEEE 802.11p based communication network or a long term evolution (LTE) based communication network.

According to a fifth aspect the application relates to a method for transmitting a communication signal, in particular a device-to-device (D2D) network communication signal, using a communication device, wherein the method comprises the steps of: in a network-assisted communication mode of the communication device, transmitting control data related to the network-assisted communication mode using a first communication resource being associated with the network-assisted communication mode; and in an ad-hoc communication mode of the communication device, transmitting control data related to the ad-hoc communication mode using a second communication resource being associated with the ad hoc communication mode.

The method according to the fifth aspect of the application can be performed, for instance, by the communication device according to the second aspect of the application. Further features of the method according to the fifth aspect of the application result directly from the functionality of the communication device according to the second aspect of the application.

According to a sixth aspect the application relates to a method for receiving a communication signal, in particular a device-to-device (D2D) network communication signal, using a communication device, wherein the method comprises the steps of: in a network-assisted communication mode of the communication device, receiving control data related to the network-assisted communication mode using a first communication resource being associated with the network-assisted communication mode; and, in an ad-hoc communication mode of the communication device, receiving control data related to the ad-hoc communication mode using a second communication resource being associated with the ad hoc communication mode.

The method according to the sixth aspect of the application can be performed, for instance, by the communication device according to the third aspect of the application. Further features of the method according to the sixth aspect of the application result directly from the functionality of the communication device according to the third aspect of the application.

According to a seventh aspect the application relates to a computer program comprising a program code for performing the method according to the fifth aspect or the method according to the sixth aspect of the application when executed on a computer.

The application can be implemented in hardware and/or software.

BRIEF DESCRIPTION OF THE DRAWINGS

Further embodiments of the invention will be described with respect to the following figures, wherein.

DETAILED DESCRIPTION OF EMBODIMENTS

Figure 1:
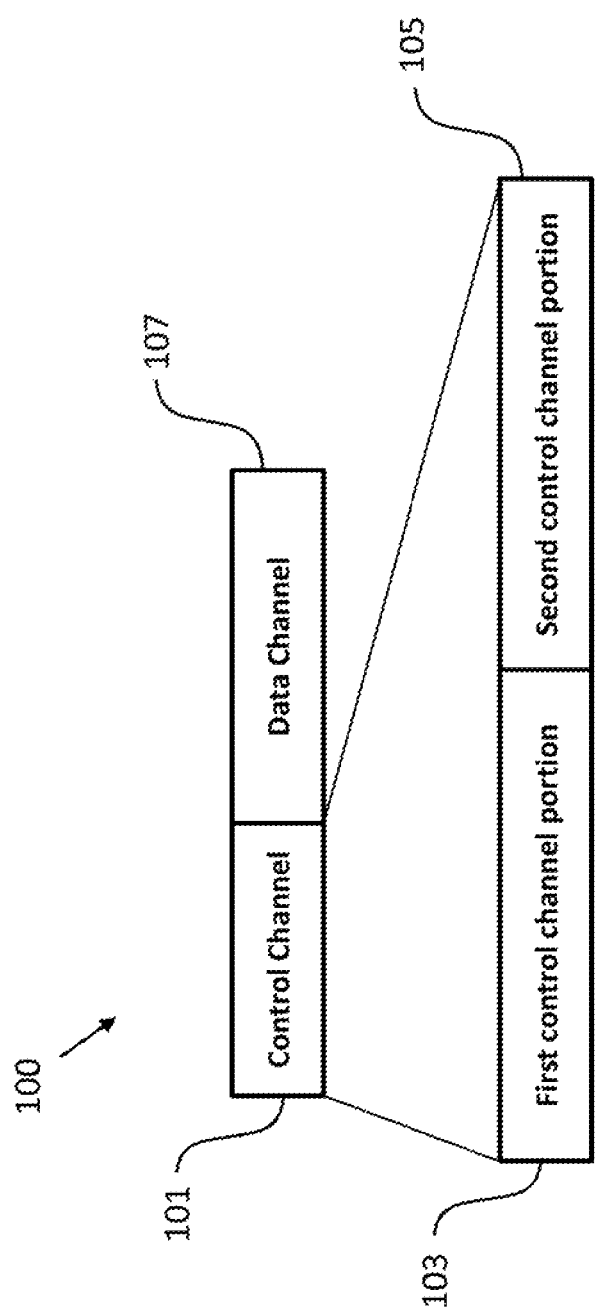
FIG. 1 shows a schematic diagram of a frame structure according to an embodiment.

FIG. 1 shows a schematic diagram of a frame structure 100 for network communication, in particular for device-to-device (D2D) network communication, according to an embodiment. The frame structure 100 comprises a control channel 101 and a data channel 107. The control channel 101 comprises a first control channel portion 103 associated with a network-assisted communication mode and a second control channel portion 105 associated with an ad-hoc communication mode.

In an embodiment, the frame structure 100 can be a unified medium access control (MAC) frame structure. In an embodiment, the frame structure 100 can be embedded within a frequency division duplexing (FDD) uplink frequency band or a time division duplexing (TDD) uplink time frame of a LTE communication frame. In an embodiment, the frame structure 100 can be embedded within a physical uplink shared channel (PUSCH) and/or a physical uplink control channel (PUCCH) of a LTE communication frame.

The frame structure 100 is configured to communicate control data within the control channel 101 by means of a first communication resource, wherein the first communication resource is associated with, i.e. assigned to the first control channel portion 103. Moreover, the frame structure 100 is configured to communicate control data within the control channel 101 over a second communication resource (being different to the first control channel resource), wherein the second communication resource is associated with, i.e. assigned to the second control channel portion 105. In other words, the frame structure 100 provides a mapping between the control channel and the physical resources (e.g. time-frequency resource blocks) available. Based on the frame structure transmit devices map the control data to be communicate to the physical resources. Furthermore, receive devices know based on the frame structure which physical resources they need to read to gather the desired control data. Finally, the frame structure 100 is configured to communicate payload data within the data channel 107 over a further communication resource. Hence, and additionally to what was said above, the frame structure 100 provides a mapping between the payload data and the physical resources (e.g. time-frequency resource blocks) available. Based on the frame structure transmit devices map the payload to be communicated to the physical resources. Furthermore, receive devices know based on the frame structure which physical resources they need to read to gather the desired payload data. The first communication resource, the second communication resource and/or the further communication resource can comprise a sub-frame, a frequency channel, a coding sequence and/or a resource block of the frame structure 100.

Figure 2:
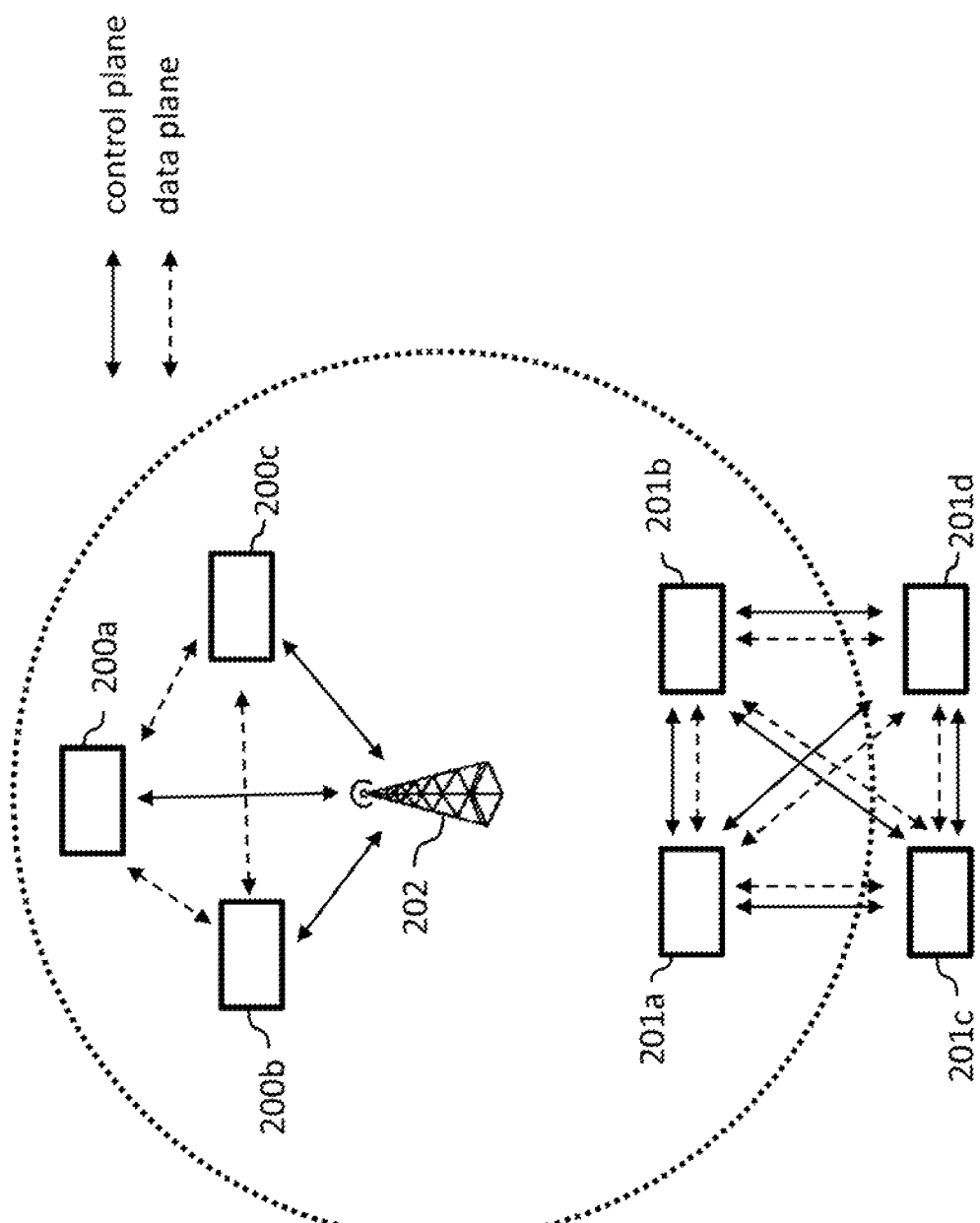
FIG. 2 shows a schematic diagram of a communication scenario including a plurality of communication devices in a network-assisted communication mode and in an ad-hoc communication mode according to an embodiment.

FIG. 2 shows a schematic diagram of a communication scenario including a plurality of communication devices in an ad-hoc communication mode and a network-assisted communication mode according to an embodiment. The upper half of FIG. 2 shows three exemplary communication devices 200a-c according to an embodiment operating in the network-assisted communication mode and communicating with an exemplary base station 202 of a cellular network. The lower half of FIG. 2 shows four exemplary communication devices 201a-d according to an embodiment operating in the ad-hoc communication mode. The communication devices 200a-c and 201a-d can be configured to operate within a vehicle-to-X (V2X) communication network or a device-to-device (D2D) communication network. The term vehicle-to-X (V2X) communications is used to cover vehicle-to-vehicle (V2V), vehicle-to-infrastructure (V2I) and vehicle-to-X (V2X) communications. The vehicle-to-X (V2X) communication network or the device-to-device (D2D) communication network can be an IEEE 802.11p based communication network or a long term evolution (LTE) based communication network.

The three exemplary communication devices 200a-c operating in the network-assisted communication mode are configured to transmit control data related to the network-assisted communication mode using a first communication resource of the frame structure 100 being associated with the network-assisted communication mode.

The four exemplary communication devices 201a-d operating in the ad-hoc communication mode are configured to transmit control data related to the ad-hoc communication mode using a second communication resource (being different to the first communication resource) of the frame structure being associated with the ad-hoc communication mode.

In an embodiment, each of the three exemplary communication devices 200a-c operating in the network-assisted communication mode is configured to switch into the ad-hoc communication mode. Likewise, each of the four exemplary communication devices 201a-d operating in the ad-hoc communication mode is configured to switch into the network-assisted communication mode, for instance, in case a cellular network becomes available.

Moreover, the three exemplary communication devices 200a-c operating in the network-assisted communication mode as well as the four exemplary communication devices 201a-d operating in the ad-hoc communication mode are configured to, when control data (e.g. transmitted from another communication device) was received using a first communication resource, determine the control data as being associated with a network-assisted communication mode and, when the control data was received using a second communication resource, determine the control data as being associated with an ad-hoc communication mode.

In an embodiment, the ad-hoc communication mode and the network-assisted communication mode can coexist with a legacy cellular mode, which can complement each other in order to provide an entire vehicle-to-X (V2X) solution and which will be explained in more detail in the context of FIG. 3 further below.

In the network-assisted communication mode, the cellular communication network can provide a fine-grained physical layer synchronization and a high degree of control of device-to device (D2D) communications via a radio resource control (RRC) signaling, e.g. using a coordinated resource allocation, a system information broadcast mode selection, a power control, and a differentiated quality of service (QoS) support with priority handling. This mode can be preferred when available. The communication network operator can be willing to support it or may have enough radio communication resources to support it.

In the ad-hoc communication mode, fully distributed ad-hoc communications among vehicle-to-X (V2X) communication devices can take place in both data and control plane. It can be an operator free solution. It can be used when the operator may not provide cellular communication network coverage in certain areas, e.g. rural areas, mountain areas, or tunnel areas, or if the operator is not able and/or willing to support vehicle-to-X (V2X) applications.

Figure 3:
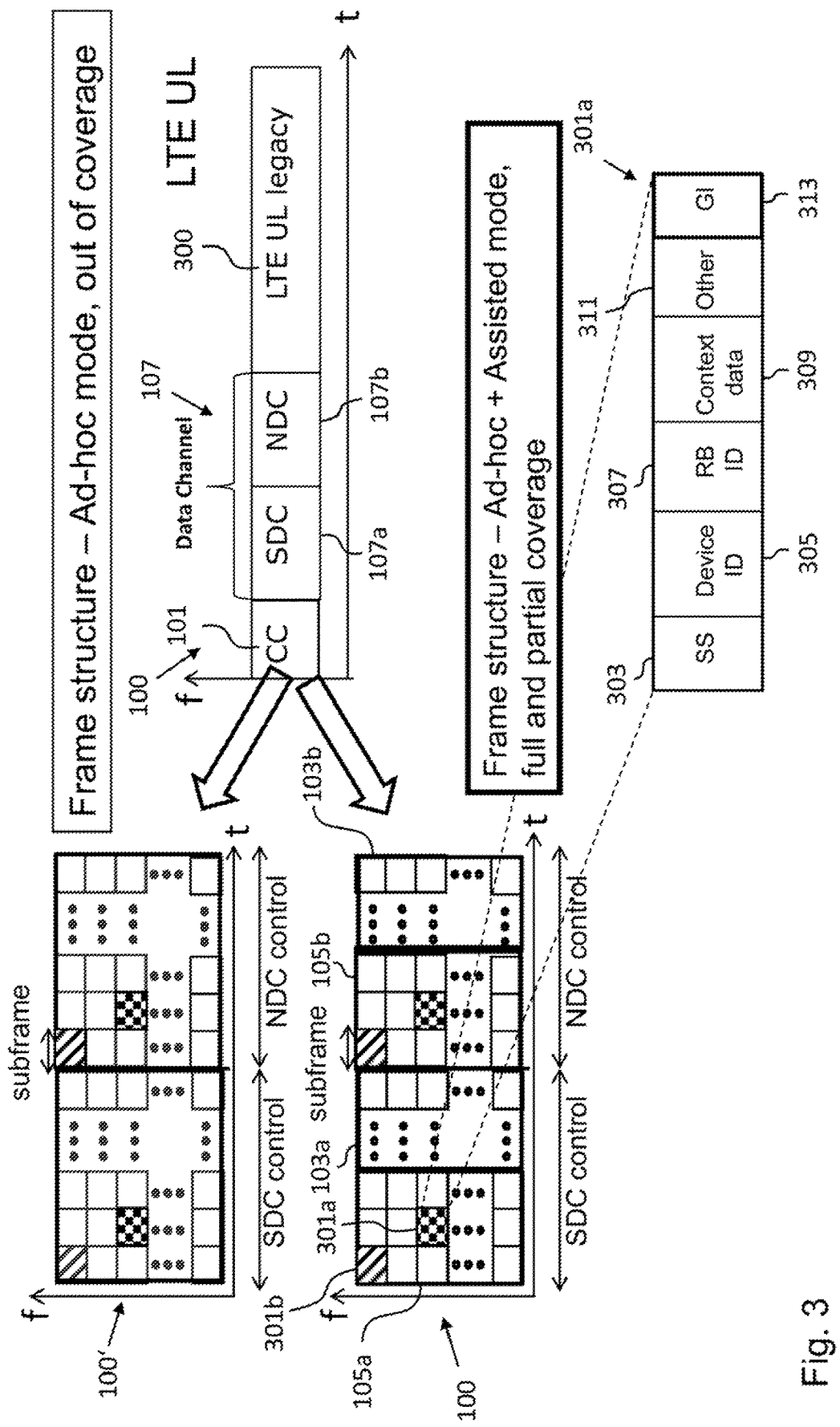
FIG. 3 shows a more detailed schematic diagram of a frame structure according to an embodiment.

FIG. 3 shows a diagram of a further embodiment of a frame structure 100 for network communication, in particular for device-to-device (D2D) network communication. As in the case of the frame structure 100 shown in FIG. 1, the frame structure 100 shown in FIG. 3 comprises a control channel 101 and a data channel 107.

Typically control data provided by a communication resource within the control channel 101 can define communication resources within the data channel 107 communicating specific payload data. In other words, the control data within the control channel 101 provides a mapping to the payload data within the data channel 107.

The control channel 101 can enable a fine-tuned synchronization, a direct neighboring device discovery, a paging, a communication resource reservation for data and can be used for exchanging communication device context information, e.g. a geographic position of a communication device.

The control channel 101 can have a permanent set of communication resources, e.g. used for a L1/L2 control among communication devices. The control channel 101 length or size can be configurable, e.g. based on a communication device density. A multi-user control channel access protocol can be used.

The data channel 107 can comprise a high priority portion 107a (referred to in FIG. 3 as "Safety Data Channel" or short "SDC") and a low priority portion 107b (referred to in FIG. 3 as "Non-Safety Data Channel" or short "NDC").

The high priority portion 107a of the data channel 107, i.e. the SDC portion, can be reserved for high priority data, e.g. hard quality of service (QoS) safety vehicle-to-X (V2X) traffic data, with high priority. It can support mixed data or traffic types, e.g. semi-persistent communication resource patterns for cooperative awareness message (CAM) periodical messages, and/or an on-demand communication resource reservation for context-rich mission-critical data (CMD). A multi-user high priority data channel communication resource reservation protocol can be used.

The low priority portion 107b of the data channel 107, i.e. the NDC portion, can serve low priority data, e.g. soft quality of service (QoS) vehicle-to-X (V2X) traffic data, with low priority, e.g. traffic efficiency application data. It can give up priority for high priority data, e.g. hard quality of service (QoS) safety traffic data. A multi-user communication resource coordination in the low priority portion 107b, i.e. the NDC portion, can be based on an on-demand reservation scheme or a carrier sense multiple access (CSMA) type reservation scheme.

The communication resources of the high priority portion 107a of the data channel 107, i.e. the SDC portion, and the low priority portion 107b of the data channel 107, i.e. the NDC portion, can be multiplexed, for instance, in the frequency domain and/or the time domain.

In the embodiment shown in FIG. 3 the frame structure 100 is embedded within an uplink LTE communication frame that can further comprise an uplink LTE communication frame portion 300. Thus, an allocation of connected communication resources within a long term evolution (LTE) structure is possible. In a downlink communication portion, communication resources may not be allocated connectedly since control frames may appear every 1 ms. A concurrent downlink (DL) receive can be achieved.

In an embodiment, when using a long term evolution (LTE) frequency division duplexing (FDD) carrier, communications can be performed within a physical uplink shared channel (PUSCH). Thus, after communication of the frame structure 100, normal long term evolution (LTE) communications can take place.

As can be taken from the more detailed view of the frame structure 100 shown on the bottom left hand side of FIG. 3, the first control channel portion 103 comprises a high priority part 103a and a low priority part 103b and the second control channel portion 105 comprises a high priority part 105a and a low priority part 105b. As the person skilled in the art will appreciate, the exact "locations" of the first control channel portion 103 and its high priority part 103a and low priority part 103b as well as of the second control channel portion 105 and its high priority part 105a and low priority part 105b within the control channel 101 are not important, as long as it is made sure that the communication devices operating within one of the communication modes use the corresponding portion of the control channel 101 for transmitting control data.

In an embodiment, the first communication resource described in the context of FIG. 1 is associated with the high priority part 103a of the first control channel portion 103, and the second communication resource described in the context of FIG. 1 is associated with the high priority part 105a of the second control channel portion 105. In an embodiment, the frame structure 100 is configured to communicate control data within the control channel 101 over a third communication resource, wherein the third communication resource is associated with the low priority part 103b of the first control channel portion 103. In an embodiment, the frame structure 100 is configured to communicate control data within the control channel 101 over a fourth communication resource, wherein the fourth communication resource is associated with the low priority part 105b of the second control channel portion 105.

FIG. 3 shows two exemplary communication resources, in particular resource blocks, 301a and 301b within the high priority part 105a of the second control channel portion 105. As can be taken from the more detailed view shown on the bottom right hand side of FIG. 3, the exemplary communication resource, in particular resource block, 301a comprises a plurality of data fields, such as a synchronization sequence or signal (SS) 303, a device ID 305, a resource block ID 307, context data 309, such as information about the location of a device, a field for other data 311 and a guard interval (GI) 313.

The synchronization sequence or signal (SS) 303, for instance, allows synchronizing communication devices operating in the ad-hoc communication mode, such as the communication devices 201a-d shown in FIG. 2. In an embodiment, this synchronization sequence or signal (SS) 303 is not required within a communication resource of the first control channel portion 103. In an embodiment, the context data 309 is not required within a communication resource of the first control channel portion 103.

The top left hand side of FIG. 3 shows an embodiment of a control channel 101', which can be used when no network assistance is available. In this case the control channel 101' only comprises a high priority part (referred to as "SDC control" in FIG. 3) and a low priority part (referred to as "NDC control" in FIG. 3).

In an embodiment, the frame structure 100 can be structured depending on a mode from a set of modes, wherein the set of modes comprises the ad-hoc communication mode and a network-assisted communication mode. In an embodiment, the frame structure 100 to be used can be switched between a first mode, e.g. the ad-hoc communication mode, and a second mode, e.g. the network-assisted communication mode, according to cellular network coverage, in particular based on a quality of the network communications. Thus, a decision criterion for automatic mode switching can be provided.

In an embodiment, a communication device, such as one of the exemplary communication devices 200a-c shown in FIG. 2, can select a communication resource within the control channel 101 and its different portions in accordance with a suitable protocol, which, however is not the focus of the present application. A suitable protocol is described, for instance, in PCT/EP2014/074742 which is fully incorporated herein by reference.

Figure 4:
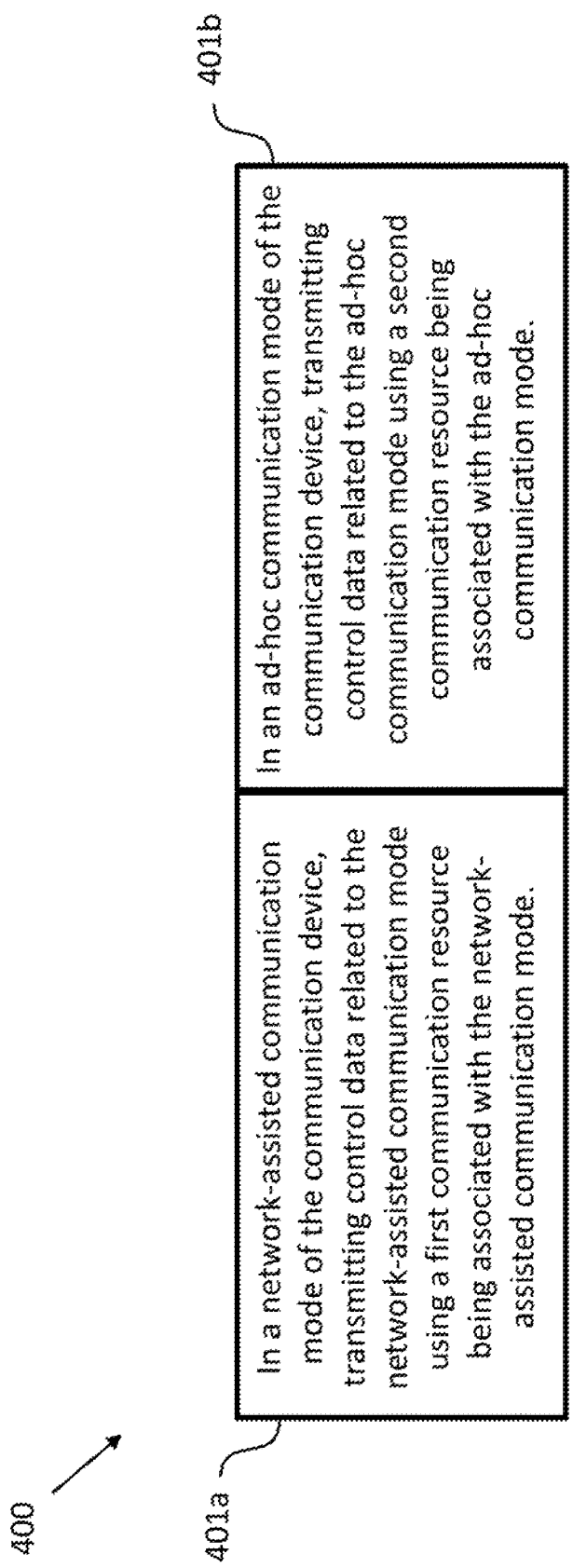
FIG. 4 shows a flow diagram illustrating a method for transmitting a D2D network communication signal according to an embodiment.

FIG. 4 shows a flow diagram illustrating a method 400 for transmitting a D2D network communication signal according to an embodiment using a communication device, for instance one of the exemplary communication devices 200a-c and 201a-d shown in FIG. 2. In a network-assisted communication mode of the communication device, the method 400 comprises the step 401a of transmitting control data related to the network-assisted communication mode using a first communication resource being associated with the network-assisted communication mode. In an ad-hoc communication mode of the communication device, the method 400 comprises the step 401b of transmitting control data related to the ad-hoc communication mode using a second communication resource being associated with the ad-hoc communication mode.

Figure 5:
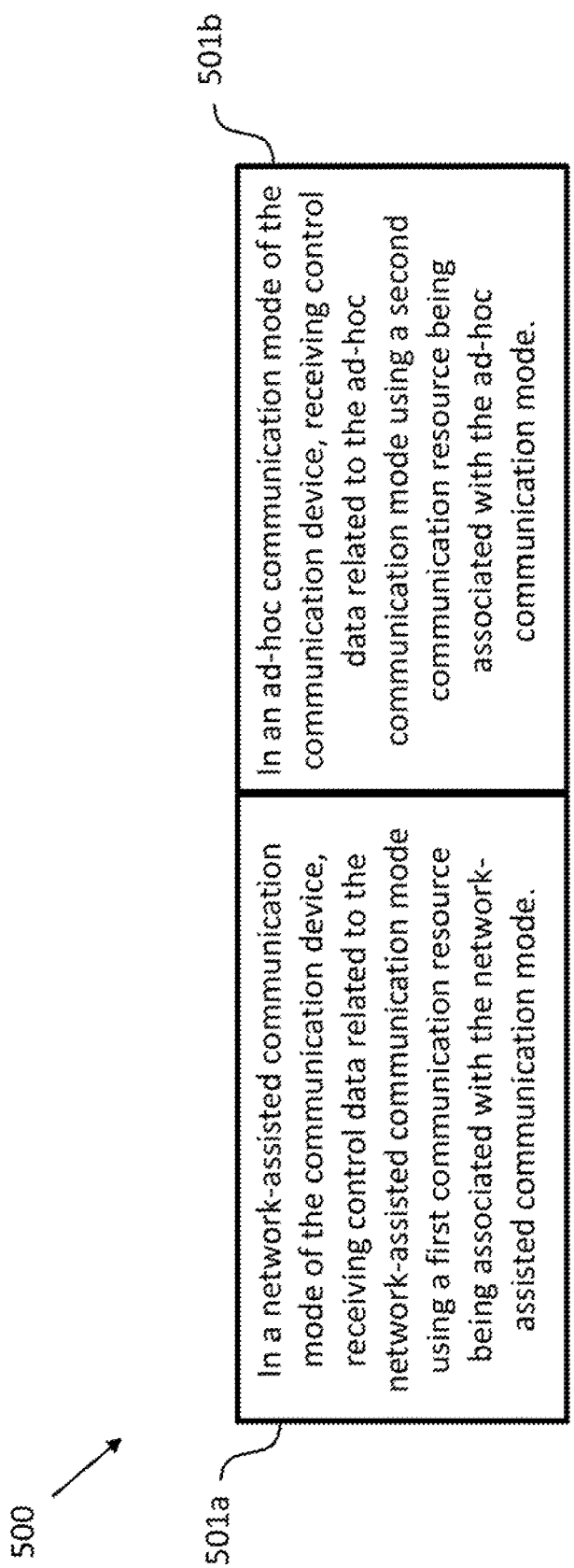
FIG. 5 shows a flow diagram illustrating a method for receiving a D2D network communication signal according to an embodiment.

FIG. 5 shows a flow diagram illustrating a method 500 for receiving a D2D network communication signal according to an embodiment using a communication device, for instance one of the exemplary communication devices 200a-c and 201a-d shown in FIG. 2. In a network-assisted communication mode of the communication device, the method 500 comprises the step 501a of receiving control data related to the network-assisted communication mode using a first communication resource being associated with the network-assisted communication mode. In an ad-hoc communication mode of the communication device the method 500 comprises the step 501b of receiving control data related to the ad-hoc communication mode using a second communication resource being associated with the ad-hoc communication mode.

Embodiments of the invention may be implemented in a computer program for running on a computer system, at least including code portions for performing steps of a method according to the application when run on a programmable apparatus, such as a computer system or enabling a programmable apparatus to perform functions of a device or system according to the application. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/ dynamic load library and/or other sequence of instructions designed for execution on a computer system.

Although the application is described with reference to specific features, implementation forms, and embodiments, it is evident that various modifications and combinations can be made thereto without departing from the spirit and scope of the application. The description and the figures are, accordingly, to be regarded simply as an illustration of the application as defined by the appended claims, and are contemplated to cover any and all modifications, variations, combinations, or equivalents that fall within the scope of the application.

The invention claimed is:

1. A communication device configured to operate in a network-assisted communication mode and an ad-hoc communication mode, wherein there is only a control plane between the communication device in the network-assisted communication mode and a base station of a cellular network, and there are both a control plane and a data plane between the communication device in the ad-hoc communication mode and one or more other communication devices, and the communication device comprises:
 a processor; and
 a non-transitory computer-readable storage medium coupled to the processor and storing programming instructions for execution by the processor, the programming instructions instruct the processor to:
 transmit, in the network-assisted communication mode, control data related to the network-assisted communication mode using a first communication resource associated with the network-assisted communication mode to another communication device within the control channel, and
 transmit, in the ad-hoc communication mode, control data related to the ad-hoc communication mode using a second communication resource associated with the ad-hoc communication mode to another communication device within the control channel; and, wherein
 the first communication resource is associated with a first control channel portion of the control channel and the second communication resource is associated with a second control channel portion of the control channel, wherein the control channel is part of a frame structure, the frame structure comprising a data channel configured to communicate payload data using a further communication resource;
 a high priority portion of the data channel is reserved for high priority data which comprises hard quality of service vehicle-to-X traffic data; and
 a low priority portion of the data channel is reserved for low priority data which comprises soft quality of service vehicle-to-X traffic data.

2. The communication device of claim 1,
 wherein the first control channel portion comprises a high priority part and a low priority part; and
 wherein the second control channel portion comprises a high priority part and a low priority part.

3. The communication device of claim 2,
 wherein the first communication resource is associated with the high priority part of the first control channel portion;
 wherein the second communication resource is associated with the high priority part of the second control channel portion;
 wherein the communication device is configured to communicate control data within the control channel over a third communication resource, the third communication resource being associated with the low priority part of the first control channel portion; and wherein the communication device is configured to communicate control data within the control channel over a fourth communication resource, the fourth communication resource being associated with the low priority part of the second control channel portion.

4. A communication device for receiving control data, wherein the communication device comprises:
   a receiver configured to receive the control data using a first communication resource from another communication device within a control channel; and
   a processor configured to determine the control data as being associated with a network-assisted communication mode and, when the control data was received using a second communication resource from another communication device within the control channel, determine the control data as being associated with an ad-hoc communication mode and, wherein there is only a control plane between the communication device in the network-assisted communication mode and a base station of a cellular network, and there are both a control plane and a data plane between the communication device in the ad-hoc communication mode and one or more other communication devices; and, wherein
   the first communication resource is associated with a first control channel portion of the control channel and the second communication resource is associated with a second control channel portion of the control channel, wherein the control channel is part of a frame structure, the frame structure comprising a data channel configured to communicate payload data using a further communication resource;
   a high priority portion of the data channel is reserved for high priority data which comprises hard quality of service vehicle-to-X traffic data; and
   a low priority portion of the data channel is reserved for low priority data which comprises soft quality of service vehicle-to-X traffic data.

5. The communication device of claim 4,
   wherein the first control channel portion comprises a high priority part and a low priority part; and
   wherein the second control channel portion comprises a high priority part and a low priority part.

6. The communication device of claim 5,
   wherein the first communication resource is associated with the high priority part of the first control channel portion;
   wherein the second communication resource is associated with the high priority part of the second control channel portion;
   wherein the communication device is configured to receive control data within the control channel over a third communication resource, the third communication resource being associated with the low priority part of the first control channel portion; and
   wherein the communication device is configured to receive control data within the control channel over a fourth communication resource, the fourth communication resource being associated with the low priority part of the second control channel portion.

7. A communication device for communicating a communication signal, in particular a device-to-device network communication signal, comprises: a processor and a non-transitory computer-readable storage medium coupled to the processor and storing programming instructions for execution by the processor, the programming instructions instruct the processor to communicate a frame structure, wherein the frame structure comprises:
   a control channel, wherein the control channel comprises a first control channel portion associated with a network-assisted communication mode and a second control channel portion associated with an ad-hoc communication mode; and
   a data channel;
   wherein the frame structure is configured to communicate control data within the control channel over a first communication resource between the communication device and another communication device, the first communication resource being associated with the first control channel portion,
   wherein the frame structure is configured to communicate control data within the control channel over a second communication resource between the communication device and another communication device, the second communication resource being associated with the second control channel portion, and
   wherein the frame structure is configured to communicate payload data within the data channel over a further communication resource; and, wherein
   a high priority portion of the data channel is reserved for high priority data which comprises hard quality of service vehicle-to-X traffic data; and
   a low priority portion of the data channel is reserved for low priority data which comprises soft quality of service vehicle-to-X traffic data.

8. The communication device of claim 7,
   wherein the first control channel portion comprises a high priority part and a low priority part; and
   wherein the second control channel portion comprises a high priority part and a low priority part.

9. The communication device of claim 8,
   wherein the first communication resource is associated with the high priority part of the first control channel portion;
   wherein the second communication resource is associated with the high priority part of the second control channel portion;
   wherein the frame structure is configured to communicate control data within the control channel over a third communication resource, the third communication resource being associated with the low priority part of the first control channel portion; and
   wherein the frame structure is configured to communicate control data within the control channel over a fourth communication resource, the fourth communication resource being associated with the low priority part of the second control channel portion.

10. The communication device of claim 7, wherein the second control channel portion comprises a communication resource for communicating a synchronization sequence for synchronizing communication devices operating in the ad-hoc communication mode.

11. The communication device of claim 7, wherein the first control channel portion does not comprise a communication resource for communicating a synchronization sequence.

12. The communication device of claim 7, wherein the second control channel portion comprises a communication resource for communicating context data.

13. The communication device of claim 7, wherein the first control channel portion does not comprise a communication resource for communicating context data.

* * * * *